July 1, 1930.    H. F. PREFONTAINE    1,769,458

CAMERA ATTACHMENT

Filed July 2, 1929    3 Sheets-Sheet 1

INVENTOR.
H. F. Prefontaine,
BY
James J. Shealy & Co.
ATTORNEYS.

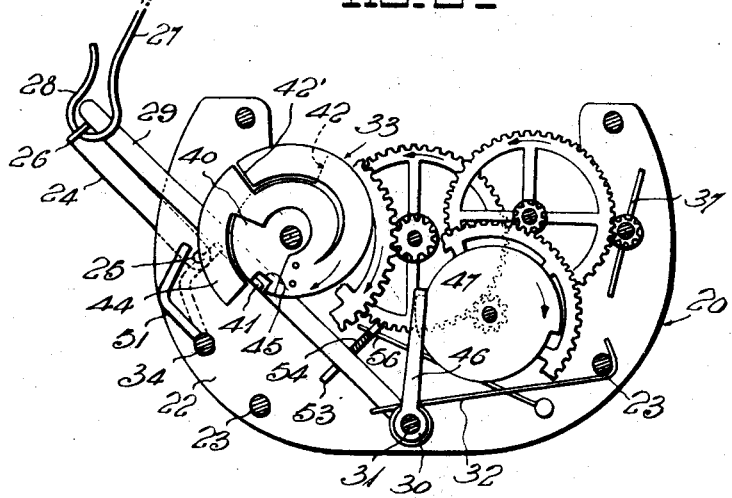
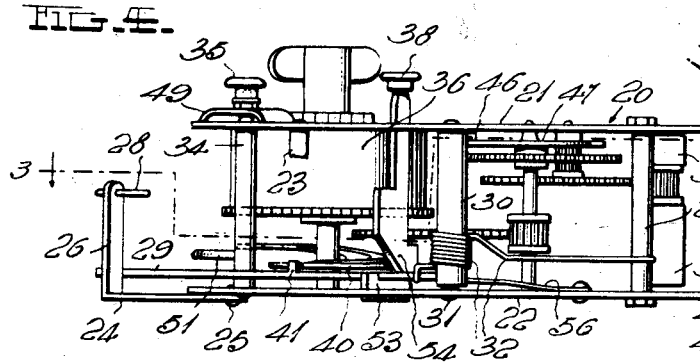
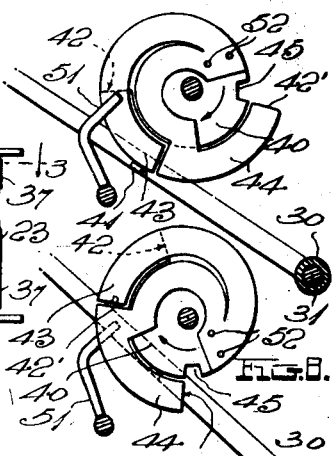
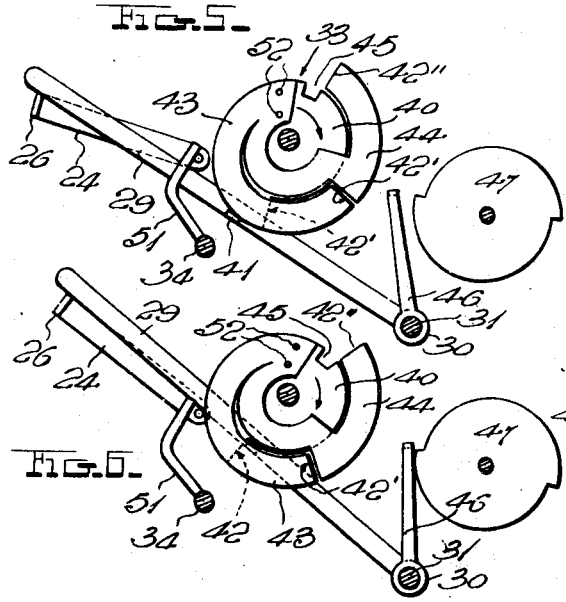
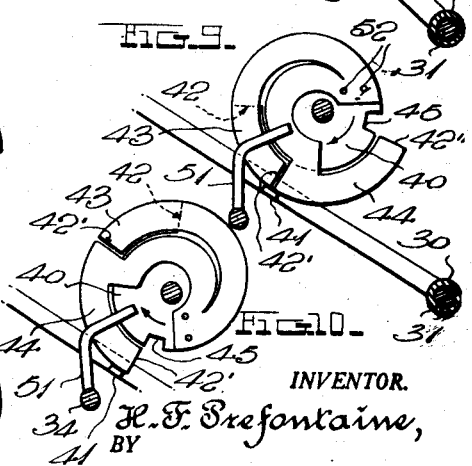

July 1, 1930.  H. F. PREFONTAINE  1,769,458
CAMERA ATTACHMENT
Filed July 2, 1929  3 Sheets-Sheet 3
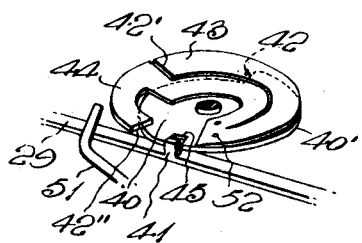
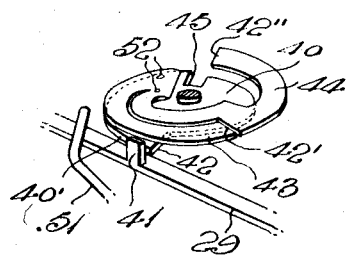
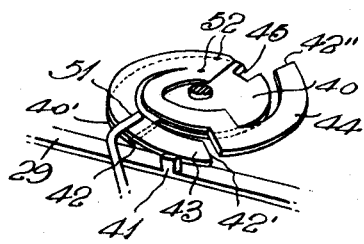
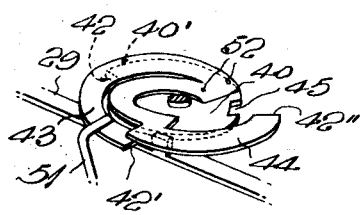
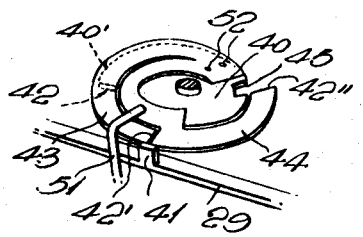
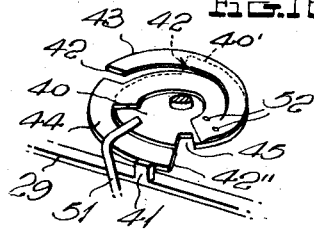
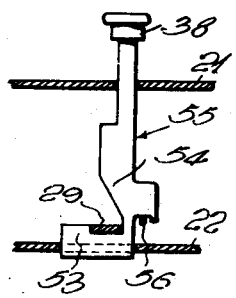
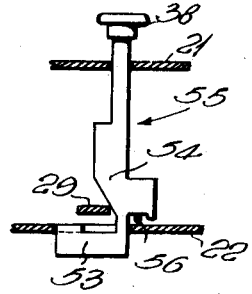
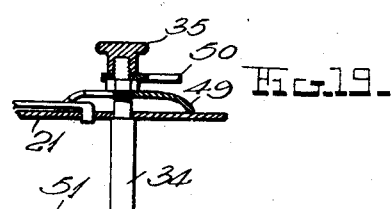
INVENTOR.
H. F. Prefontaine,
BY
ATTORNEYS.

Patented July 1, 1930

1,769,458

UNITED STATES PATENT OFFICE

HARRY F. PREFONTAINE, OF BROOKLYN, NEW YORK

CAMERA ATTACHMENT

Application filed July 2, 1929. Serial No. 375,451.

The invention relates to a unique operating means for camera shutters, enabling a person to photograph himself, alone or with others, without the aid of any hand-operating control extending from the camera to a point at which the person will pose.

One aim of the invention is to provide a novel shutter operating means which may be started by a button or like control after making all necessary preparations, but will give ample time for the person so starting it to pose in front of the camera before the shutter is operated to make the exposure.

A further object is to make unique provision whereby exposures of different duration may be made, for instance, (1) instantaneous, (2) three seconds, (3) eight seconds and (4) sixteen seconds. In producing these exposures, the conventional instantaneous, bulb and time adjustments of the shutter are used with adjustments of the shutter operator as will be described.

In making provision for the different exposures, another object is to provide a novel cam for actuating a shutter operating member, said cam being so adjustable as to vary its effective length and to thereby vary the length of the exposure.

The above mentioned cam is, in the present disclosure provided with relatively movable cam sections for varying its effective length, and it is another object of the invention to provide efficient means controlled by a single knob or the like, for relatively adjusting said sections to obtain any desired exposure.

Yet other aims are to provide means controlled by the position of the aforesaid shutter operating member for normally holding the cam and a spring motor which drives it, against operation, to provide unique means for latching said member in its cam and motor holding position, to provide novel means for forcing said member from this position to the position at which the motor drives the cam, and to provide a single knob or the like for successively releasing said latching means and operating said forcing means.

A further object is to provide connecting means between the shutter and the shutter operator which will permit manual operation of said shutter when desired, without movement of any part of said operator.

With the foregoing and minor objects in view, the invention resides in the novel subject matter hereinafter described and claimed, description being accomplished by reference to the accompanying drawings whose figures will first be briefly explained.

Figure 3 is a vertical sectional view on line 3—3 of Figure 4.

Figure 4 is a bottom plan view of the shutter operating mechanism.

Figure 5 is a detail view similar to a portion of Figure 3 but showing the cam and the shutter operating member in positions assumed while making a snap-shot exposure or a three second exposure.

Figure 6 is a view similar to Figure 5 but showing the relative positions of parts at the completion of a snap-shot or three second exposure.

Figures 7 and 8 are views similar to Figures 5 and 6 but showing the relation of parts incident to making an eight second exposure.

Figures 9 and 10 illustrate two positions of parts while making a sixteen second exposure.

Figures 11 to 16 are detail perspectives showing more clearly about the same relative positions of parts as seen in Figures 5 to 10 respectively.

Figure 17 is a detail sectional view substantially on line 17—17 of Figure 2 showing the normal position of the latching means and the forcing means for the shutter operating member.

Figure 18 is a view similar to Figure 17 but showing the latching means released and the forcing means in operation.

Figure 19 is a detail section on line 19—19 of Figure 2.

The figures above briefly described illustrate the preferred construction and while such construction will be herein described specifically, it is to be understood that within the scope of the invention as claimed, numerous variations may be had. Moreover, although the invention is shown in connection with a box type camera, it will be understood that it is applicable also to folding cameras, with minor changes.

On the drawings, C denotes the camera and S has reference to its shutter, said shutter having the usual adjustment A for instantaneous and time exposures.

D denotes the control member of the shutter, connected by a link L to a handle H. All parts so far referred to by letters of reference are of conventional form.

Figure 1:
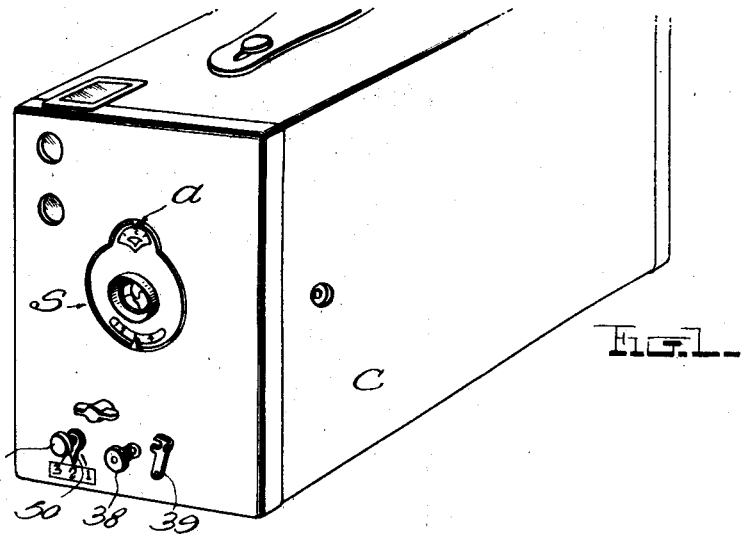
Figure 1 is a perspective view illustrating a box type camera embodying the invention.
Figure 2:
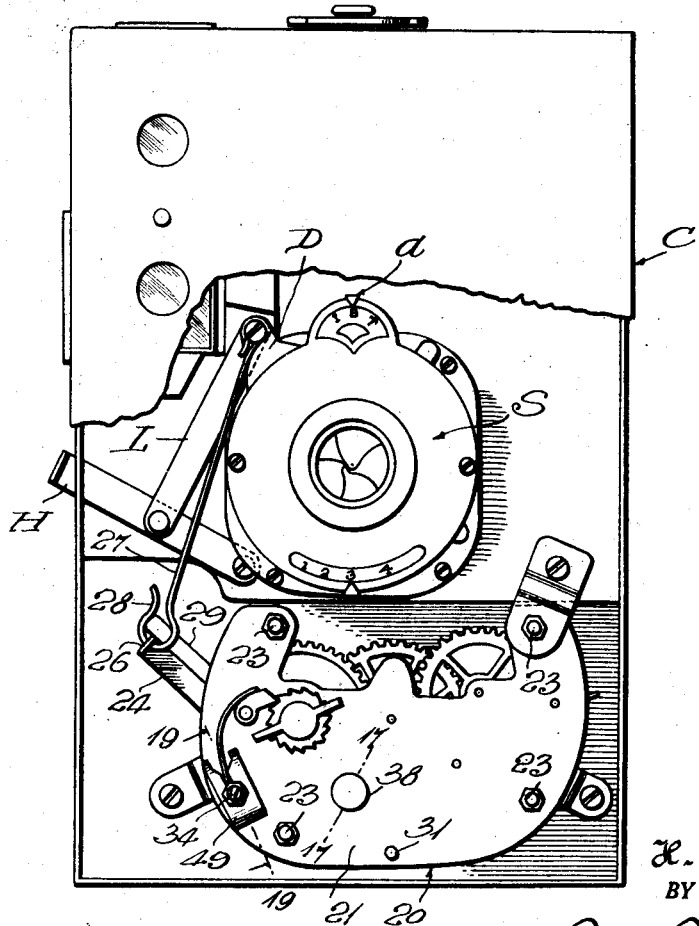
Figure 2 is a front elevation, parts of the camera case being broken away.

Mounted in the camera case below the shutter S, is a frame 20 composed of front and rear plates 21—22 and appropriate spacing and connecting means 23 between them. An arm 24 is pivoted at 25 to the rear plate 22 of the frame 20 and is provided with a lateral outer end 26 connected by a link 27 with the control member D, said link preferably having a detachable connection with the arm 24, afforded by a hook 28 passed through an opening in the end 26 of said arm. A shutter operating arm 29 lies upon the aforesaid end 26 of arm 24 and at its inner end is pivoted to the frame 20 for vertical swinging. In the present showing, arm 29 is secured to a sleeve 30 mounted loosely upon a fixed shaft 31 which is secured to the plates 21—22 and said arm 29 is normally raised by a spring 32. A rotatable cam 33 is provided to downwardly force the arm 29, hold it for a predetermined interval and then allow it to again ascend, thereby causing operation of the shutter S through the instrumentality of the operating connections 26, 24, 28 and 27. Cam 33 is adjustable to vary the length of the interval between the downward and upward movements of arm 29 and a normally rotatable shaft 34 having a knob 35, is provided for effecting adjustment of said cam as will be hereinafter described. A spring motor 36 having a suitable governor 37 is mounted on frame 20 for driving the cam 33 when permitted to function, but ordinarily operation of motor and cam is prevented by holding means hereinafter explained, said holding means being releasable by means of a second knob 38. A safety device 39 (Figure 1) is preferably employed to lock knob 38, against accidental movement.

The cam 33 embodies a disk 40 having a spirally directed cam edge 40' co-operable with a shoe portion 41 of arm 29 in effecting depression of this arm as will be clear from Figures 5 and 12 of the drawings. The cam edge has an abrupt terminal 42 and as soon as such terminal frees the shoe 41 (Figure 6) arm 29 is restored to a raised position by the spring 32, effecting operation of the shutter S for a snap-shot or three second exposure, according to the adjustment at A. Shutter operation however, does not occur for a sufficient length of time to enable the person releasing the spring motor 36 to pose in front of the camera. Due to the construction of the cam 33, arm 29 may be held in its lowered position for greater periods of time, for making time exposures of say eight seconds or sixteen seconds. This operation can best be understood after specifically describing the cam structure.

At one side of disk 40 is an arcuate cam section or spring finger 43 secured at one of its ends to said disk and having its other end extended beyond the cam terminal 42. Under its own resiliency, the finger 43 normally occupies a position at which it diverges from the plane of the disk 40 and will not interfere with release of the shoe 41 by the terminal 42. However, provision is made for forcing the finger 43 toward the disk 40 if desired, to cause the peripheral edge of said finger to receive the shoe 41 as seen in Figures 7 and 13, thereby holding the arm 29 against ascent for a longer period, that is, until the terminal 42' of said finger frees the shoe 41 as in Figure 14. In the interval between maximum downward movement of arm 29 by the cam edge 40' and the time at which terminal 42' frees said arm and permits ascent thereof, the shutter S has been operated for an exposure longer than a snap-shot, say an eight second exposure.

A second arcuate cam section or spring finger 44 is secured at one of its ends to the disk 40. The other end of this finger 44 extends beyond the terminal 42' of finger 43 but normally diverges from the disk 40 to a position at which it will not interfere with shoe 41 leaving said finger 43, as will be clear from Figures 13 and 14. If desired however, finger 44 may be forced toward the disk 40 to the position seen in Figure 15, in which position it will receive the shoe 41 and hold the arm 29 depressed a still longer period than finger 43 would have held it, thereby operating the shutter for a time exposure, for instance of sixteen seconds.

Whenever arm 29 is released by terminal 42, 42' or 42'' (of finger 44) the arm 29 is raised by the spring 32 and the shoe 41 is finally received in a notch 45 in the disk 40, as in Figures 3 and 11. At the same time a stop arm 46 on sleeve 30 coacts with a shouldered disk 47 driven by the motor 36 as seen in Figure 3. Consequently, the motor 36 and the cam 33 are now held in the normal position to which they have returned and before the device can again operate, it is necessary that the arm 29 be initially moved to free the shoe 41 from the notch 45 and arm 46 from disk 47. This is accomplished by moving knob 38 as will hereinafter appear.

For adjusting the cam 33, that is for inwardly moving its finger 43 or both fingers 43 and 44, above explained, I provide the shaft 34 which is turnable to different positions by means of the knob 35 and held in such positions by a spring brake 49, a suitable pointer 50 and coacting scale being provided for use in setting said shaft at any of three positions. Shaft 34 is near the periphery of cam 33 and is parallel with the cam axis. This shaft is provided with a rigid lateral arm 51 shown in a number of the views. With shaft 34 at one position (Figures 3 and 11) arm 51 does not contact with either finger 43 or 44. When shaft 34 is turned to a second position arm 51 forces finger 43 into operative position as in Figures 7 and 13 and upon sufficient rotation of the cam said arm passes from contact with said finger 43 without touching finger 44, which then moves at the outer side of said arm (see Figure 8). When shaft 34 is turned to its third position, arm 51 will engage both fingers 43 and 44 as in Figures 9 and 15, thereby holding them in position for coaction with shoe 41.

The inner end of finger 44 it will be observed is at the inner edge of finger 43 and the two are cut from a single spring metal plate in the construction shown, said plate being secured by rivets or the like 52 to the disk 40. When arm 51 is in the position of Figures 7 and 13 it is not far enough toward the center of cam 33 to touch the inner end portion of finger 44 which is necessary to force this finger to operative position.

The arm 29 above described is held in its normal position with shoe 41 in notch 45 (Figures 3 and 11), by latch means 53 (see Figures 3, 4, 17 and 18). Upon release of this latch means 53, means 54 (Figures 3, 4, 17 and 18) comes into play to initially move the arm 29 to the position at which it frees the cam 33 and the spring motor 36, allowing the latter to drive the former. Both means 53 and 54 are operatively connected with and operated successively by the knob 38. In the present disclosure, the knob 38 latch means 53 and forcing means 54 are all embodied in a single slide 55 passing through openings in the plates 21 and 22. Means 53 is in the form of a rigid hook and means 54 in the form of a cam. A spring 56 acting on slide 55 (Figures 3, 4, 17 and 18) engages the hook 53 with the arm 29 upon upward return of the latter to its normal motor and cam holding position, after release of said arm by any of the cam terminals 42, 42′ and 42″. Arm 29 never passes beyond the bill of hook 53 and hence the latter cannot interfere with ascent of said arm.

To operate the camera so that the user can photograph himself, alone or with others, the camera is solidly supported, proper adjustments are made at A and 35 and knob 38 is forced inwardly. This releases the cam 33 and motor 36 and the former starts moving the arm 29 downwardly ample time being allowed by the timing and structure of the device to allow the user to pose before the device operates the shutter. If knob 35 be set at its first position only the disk 40 will coact with the shoe 41 and a snap-shot or a three second exposure may be produced according to the setting of the adjustment A. When knob 35 is set at its second position, both disk 40 and finger 43 will coact with shoe 41 and a longer exposure will be made, for instance eight seconds. Setting knob 35 at its third position will insure that disk 40, finger 43 and finger 44 shall successively coact with shoe 41, thereby effecting a still longer exposure, say sixteen seconds. By suitably changing the speed of the motor 36 exposures of other duration could of course be obtained.

The shutter 5 may be hand operated if desired and when so doing arm 24 will move without moving any parts of the attachment due to its relation with arm 29.

What I claim is:

1. In combination with a camera shutter; mechanical operating means for said shutter, and connecting means between said shutter and said operating means embodying separate members movable one by the other to mechanically operate the shutter and movable one with respect to the other to allow manual shutter operation without moving said operating means.

2. In a shutter operating means, a shutter operating member, a rotatable cam disk having a spirally directed cam edge of a length to move said member a predetermined distance from an idle position said cam edge having a terminal allowing return of said member to said idle position, a normally idle arcuate finger connected at one of its ends to the disk and extending beyond said terminal, said finger normally diverging from the disk to prevent engagement with said member but being movable toward said disk to an operative position at which it will receive said member when the latter is freed by said cam edge of the disk, thereby preventing return of said member when desired until freed by the terminal of said finger, and means for moving said finger to said operative position.

3. In a shutter operating means, a shutter operating member, a rotatable cam disk having a spirally directed cam edge of a length to move said member a predetermined distance from an idle position, said cam edge having a terminal allowing return of said member to said idle position, a normally idle arcuate finger connected at one of its ends to the disk and extending beyond said terminal, said finger normally diverging from the disk to prevent engagement with said member but being movable toward said disk to an operative position at which it will receive said member when the latter is freed by said cam edge of the disk, thereby preventing return of said member when desired until freed by the terminal of said finger, and means for moving said finger to said operative position; said finger being resilient and normally self-maintained in diverging relation with said disk.

4. In a shutter operating means, a shutter operating member, a rotatable cam disk having a spirally directed cam edge of a length to move said member a predetermined distance from an idle position, said cam edge having a terminal allowing return of said member to said idle position, a normally idle arcuate finger connected at one of its ends to the disk and extending beyond said terminal, said finger normally diverging from the disk to prevent engagement with said member but being movable toward said disk to an operative position at which it will receive said member when the latter is freed by said cam edge of the disk, thereby preventing return of said member when desired until freed by the terminal of said finger, a second normally arcuate finger normally diverging from the disk and connected at one of its ends with said disk, said second finger extending beyond the terminal of the first named finger and being movable toward the disk at an operative position at which it will receive said member when the latter is freed by said first named finger, thereby preventing return of said member when desired until it is freed by said second finger, and means for moving the first named finger above to its operative position or for moving both of said fingers to their operative positions.

5. A structure as specified in claim 4; both of said fingers being resilient and normally self-maintained in diverging relation with said disk.

6. In a shutter operating means, a shutter operating member, a rotatable cam disk having a spirally directed cam edge of a length to move said member a predetermined distance from an idle position, said cam edge having a terminal allowing return of said member to said idle position, a normally idle arcuate finger connected at one of its ends to the disk and extending beyond said terminal, said finger normally diverging from the disk to prevent engagement with said member but being movable toward said disk to an operative position at which it will receive said member when the latter is freed by said cam edge of the disk, thereby preventing return of said member when desired until freed by the terminal of said finger, a second normally idle arcuate finger normally diverging from the disk and connected at one of its ends with said disk, said second finger having an inner end portion lying at the inner edge of the first named finger and an outer end portion extending beyond the terminal of said first named finger, said second finger being movable toward the disk to an operative position at which it will receive said member when freed by the first named finger, thereby preventing return of said member when desired until it is freed by said second finger, a normally turnable shaft near the periphery of said disk and parallel with the disk axis, and a lateral arm on said shaft adapted to lie against only the first named finger or against both of said fingers to force one or both thereof to operative position.

7. A structure as specified in claim 6; both of said fingers being formed from a single spring metal plate and being normally maintained in diverging relation with said disk by their own resiliency.

8. In a shutter operator, a normally idle shutter operating member, spring-driven means for moving said member in one direction and for later effecting return of said member to its normal position, holding means controlled by the position of said member for normally holding said spring-driven means against operation, self-applied latch means for holding said member in its normal position, means for initially forcing said member from its normal position to release said spring-driven means and allow operation of said member by said spring-driven means, and a manual control device operatively connected with said latch means and said forcing means for successively releasing the former and operating the latter.

9. A structure as specified in claim 8; said latch means forcing means and control means, forcing means and control device being initially embodied in a single movably mounted member; said forcing means being constituted by a cam on this member, said latch means being formed by a hook on the same member and said releasing means being a knob thereon.

10. A shutter operator comprising a frame, a spring motor mounted there on, a shutter operating arm pivoted to said frame, a spiral cam driven by said motor and operatively related with said arm for moving the same from a normal position and later effecting return to said position, said cam embodying shiftable portions for varying its effective length, a manually turnable shaft mounted on said frame and having means for shifting said positions of the cam and manually releasable means on the frame for normally holding said spring motor and cam against operation.

11. A shutter operator comprising a frame, a spring motor mounted thereon, a shutter operating arm pivoted to said frame, a spiral cam driven by said motor and operatively related with said arm for moving the same from a normal position and later effecting return to said position, said cam embodying shiftable portions for varying its effective length, a manually turnable shaft mounted on said frame and having means for shifting said portions of the cam; means controlled by the movement of said arm for holding said motor and cam against operation when said arm is in its normal position and a manually movable spring-held member mounted on the frame, said member having a hook for holding said arm in its normal position and a cam for forcing said arm initially from said normal position after movement of said member to release said hook, the cam effected movement of said arm serving to release said holding means, allowing said cam to operate said arm.

In testimony whereof I have hereunto set my hand.

HARRY F. PREFONTAINE.